United States Patent

[11] 3,547,124

[72] Inventor  Keith Arnold Fergusson
              116 Tiraumea Drive, Auckland, New Zealand
[21] Appl. No. 726,103
[22] Filed     May 2, 1968
[45] Patented  Dec. 15, 1970
[32] Priority  May 5, 1967
[33]           New Zealand
[31]           No. 148,674

[54] APPARATUS FOR CASTRATING OR DOCKING ANIMALS
     12 Claims, 9 Drawing Figs.
[52] U.S. Cl. .................................................. 128/303,
                                              128/306, 128/326
[51] Int. Cl. .................................................. A61b 17/00
[50] Field of Search ........................................ 128/303,
                               303.1, 305, 306, 319, 320, 325—327, 330

[56]                    References Cited
                   UNITED STATES PATENTS
     2,619,964  12/1952  Thaete ........................  128/303
     2,942,604   6/1960  Gravlee ......................  128/326X Primary Examiner—L. W. Trapp
Attorney—Young & Thompson ABSTRACT: A docking or castrating applicator has a locating means which locates a flexible ring in a fixed position over a spike. A hook is inserted in the ring and moved to stretch the ring around a tube, and discharge means are provided operable to discharge the stretched ring over the tail or scrotum of an animal placed within the ring.

PATENTED DEC 15 1970

INVENTOR
KEITH A. FERGUSSON
BY Young + Thompson
ATTYS

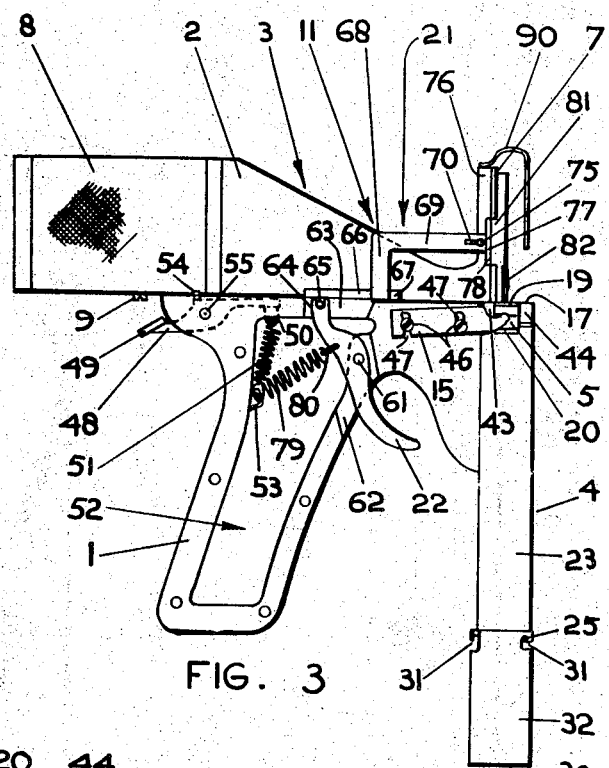
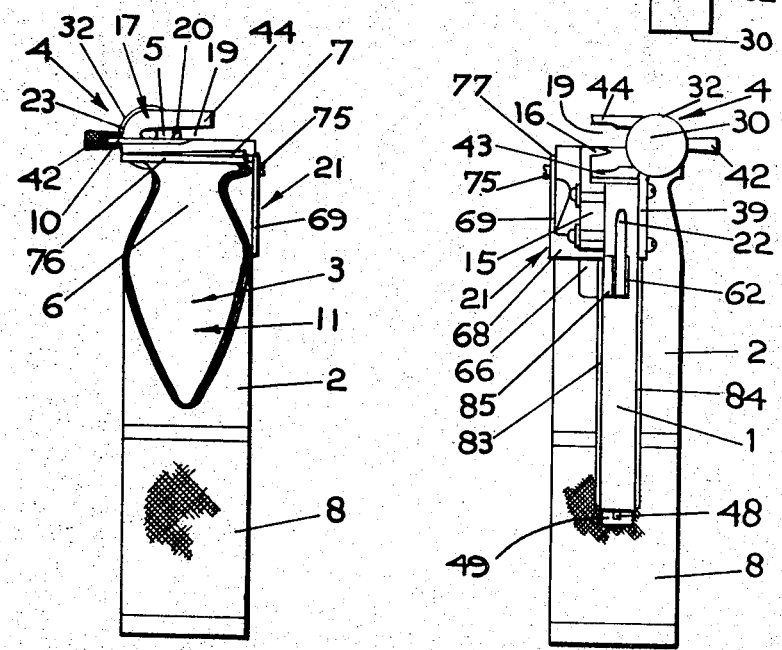
FIG. 3
FIG. 4
FIG. 5
INVENTOR
KEITH A. FERGUSSON
By Young & Thompson
ATTYS

PATENTED DEC 15 1970

INVENTOR
KEITH A. FERGUSSON
BY Young + Thompson
ATTYS.

APPARATUS FOR CASTRATING OR DOCKING ANIMALS

This invention relates to a method and apparatus for castrating or docking animals by applying a flexible ring around the scrotum or tail of the animal to be castrated or docked.

A form of apparatus currently used for such a purpose includes a number of prongs, usually four, the tips of which are inserted through the central aperture of a flexible ring. The tips are then moved outwardly in a radial direction to stretch the ring which is then passed over the tail or scrotum of the animal until a suitable place is reached where the ring is allowed to contract onto it. The tips of the prongs are then removed. One of the main disadvantages of this known form of apparatus is that it is slow to operate.

It is therefore an object of the present invention to provide a method of applying and an applicator for flexible rings for castrating or docking animals which goes at least some distance towards overcoming the abovementioned disadvantage and/or which will at least provide the public with a useful choice.

Accordingly the present invention consists in a method of applying a flexible ring to the tail or scrotum of an animal comprising the steps of stretching a flexible ring over an open end of a tube so that said flexible ring lies around the perimeter of said tube, placing the tail or scrotum of an animal within said tube so that the position where the ring is to be placed is adjacent said open end of said tube and moving said flexible ring off said tube at said open end so that said flexible ring contracts onto said animal.

In a further aspect the present invention consists in an applicator for applying a flexible ring for use in docking or castrating an animal, said applicator comprising locating means for locating a flexible ring in a fixed position from which said ring can be removed by operation of said applicator, a spike pointing towards said fixed position and in stationary relationship therewith, a tube having an open end which is close to said fixed position, the plane of said open end being substantially coincident with an axial plane of a flexible ring located in said fixed position, the axis of said tube lying at substantially right angles to the axis of such a flexible ring; a hook substantially coplanar with said end of said tube and protruding beyond the perimeter thereof a suitable distance; operable means to move said hook and said spike relative to each other in a rotary motion about the axis of said tube to stretch a flexible ring around said tube and discharge means to dislodge a flexible ring which has been stretched around the perimeter of said tube, the construction and arrangement being such that in use upon relative rotation said hook penetrates the central aperture of a flexible ring located in said fixed position and moves said ring therefrom and over said spike which also penetrates said central aperture further relative rotation causing said ring to be progressively stretched around the perimeter of said tube part of said flexible ring eventually slipping off said spike so that the whole of said ring is stretched around the perimeter of said tube said discharge means being operable to dislodge said ring over said open end of said tube where it can contract around the suitably situated tail or scrotum of an animal.

One preferred form of the present invention will now be described with reference to the accompanying drawings in which:

FIG. 3 is the reverse side elevation of the applicator with the cover plates removed;

FIG. 4 shows the applicator in plan view from above;

FIG. 5 shows the applicator in plan view from below;

In FIGS. 4 to 8 the double pronged member at the front of the applicator which prevents the flexible rings from flying too far forward when they are dislodged from the tube is not shown.

Figure 1:
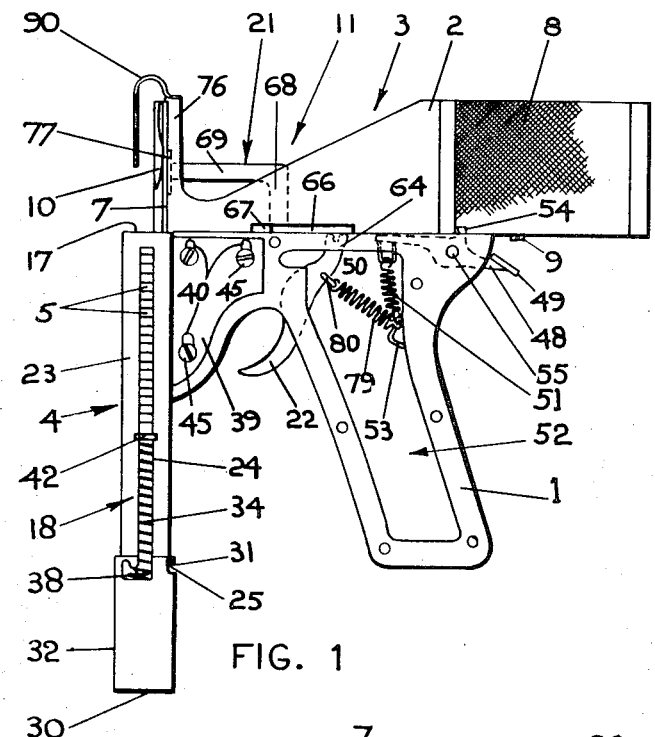
FIG. 1 is a side elevation of an applicator for flexible rings, the cover plates for the butt of the handgrip being removed to show the trigger mechanisms.

In the preferred form of the present invention an applicator for applying flexible O-rings to the tails or scrotums of animals to be docked or castrated comprises a butt-shaped grip 1 to which is rigidly attached a fixed tube 2 which is approximately one and three-quarter inches in diameter. A portion of the wall of the fixed tube 2 is removed to provide for an inspection aperture 3 which assists as will be described later, in locating the flexible rings in the correct position on the tail or scrotum of the animal concerned. To the front of the butt 1 is fastened a magazine 4 which holds a stack of flexible rubber O-rings 5 (FIG. 1). The top ring of the stack is maintained in a fixed position close to the front end of the fixed tube 2 by suitable means which will be described in more detail below. The interior surface of the fixed tube 2 provides a bearing surface for a rotatable tube 6 which passes through it. The tube 6 is rotatable about its axis with respect to the fixed tube 2 but is unable to be moved in an axial direction because of the presence of a protruding ring guide 7 which forms a ridge on the front end of the rotatable tube 6 just beyond the front end of the fixed tube 2, and a knurled handgrip 8 at the rear end of the tube 6. The knurled handgrip 8 is fitted over the rear end of the rotatable tube 6 and is fixed to it by means of a grub screw 9. Thus, when the knurled handgrip 8 is rotated the rotatable tube 6 also rotates.

An inspection aperture 11 is also provided in the rotatable tube 6 and is so positioned that it is aligned with inspection aperture 3 when a flexible ring is in position ready for application to an animal.

A hook 10 which is attached to the front end of the rotatable tube 6 and substantially lies in the plane containing that end extends beyond the perimeter of tube 6 in such a manner that it will penetrate the central aperture of the top flexible ring 5 in the magazine 4 on rotation of the rotatable tube 6 in the appropriate direction. This will be explained further below.

Also attached to the butt 1 of the applicator is a block 15 bearing at the forward end thereof a spike 16. The spike 16 points towards the fixed position which is occupied by the top flexible ring 5 in the magazine and its length is substantially perpendicular to the axis of the stack of O-rings.

Figure 2:
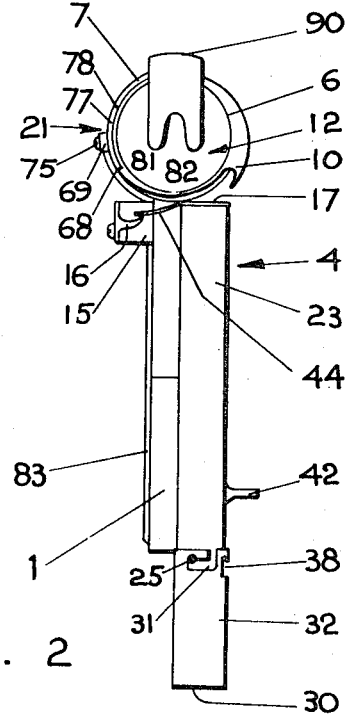
FIG. 2 is a front elevation of the applicator.
Figure 6:
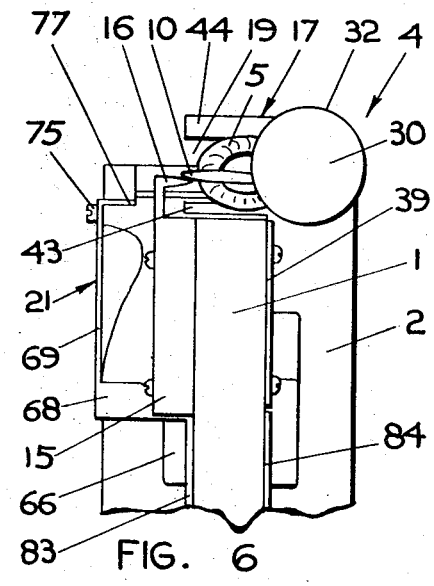
FIG. 6 shows the front portion of the applicator in plan view from below showing how a flexible ring is pulled from the magazine.
Figure 7:
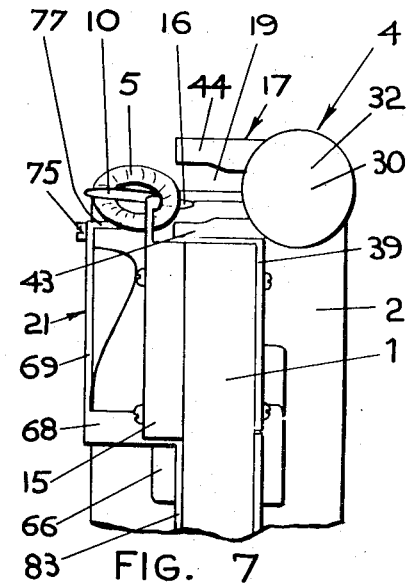
FIG. 7 is a similar view to that shown in FIG. 6 showing how a flexible ring is hooked over the spike.
Figure 8:
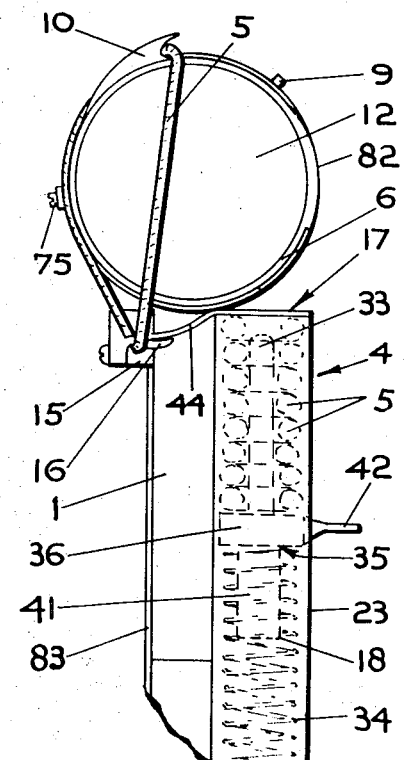
FIG. 8 is part of a front elevation showing how a flexible ring is rolled around the perimeter of the tube and internal details of the magazine.

Locating means for the top flexible ring ensure that it is correctly positioned in relation to the hook 10 and the spike 16 and include U-shaped stop means 17 (FIG. 4 and FIG. 1) provided at the top of the magazine 4 and pressure means 18 at the bottom of the magazine. The stop means 17 prevent the stack of rings from being pressed out of the magazine by virtue of the pressure exerted on the bottom of the stack by pressure means 18. The shape of the stop means 17 is such that there is a slot 19 in the top of the magazine through which the hook 10 may pass on rotation of the rotatable tube 6 to penetrate the central aperture of the top O-ring 5 in the stack (see FIG. 4). The side of the magazine facing the spike 16 includes a slot 20 which communicates with the slot 19 and through which the top O-ring may be drawn on suitable rotation of the hook 10. Rotation of the hook 10 which is in a clockwise sense as viewed in FIG. 2 thus results in the top flexible ring 5 being hooked from its fixed position and dragged out of the slot 20. FIG. 6 illustrates an O-ring 5 emerging from the slot 20. Further rotation of the hook 10 causes the O-ring 5 to be impaled over the spike 16 which penetrates the central aperture as is shown in FIG. 7 and as rotation proceeds still further the O-ring is gradually stretched around the perimeter of the rotatable tube 6 at the front end thereof. This is shown in FIG. 8. A point is eventually reached when the hook reaches the 3 or 4 O'clock position where the rubber ring slides off the spike 16 and lies wholly around the perimeter of the end of the rotatable tube 6.

When the ring is in this position the tail or scrotum of an animal is inserted either through the forward open end 12 of the tube 6 or through the inspection apertures 3 and 11 which are so situated that they are aligned in this position. Discharge means 21 are provided which include the trigger 22 and which when operated cause the ring 5 to be rolled off the prong of the tube 6 where it contracts around the scrotum or tail of the animal.

Having described in a general way the construction and function of the apparatus more detailed particulars will now be dealt with.

The magazine 4 comprises a tube 23 having a slot 24 along almost its whole length. The flexible rings 5 are a loose fit within tube 23. Slot 23 is open at the bottom end, i.e. the end furthest away from the fixed tube 2. Two pins 25 on opposite ends of a common diameter extend outwardly from the walls of the magazine tube 23. Each pin 25 is engageable with a slot 31 provided in the top edge of a magazine cap 32 in use which is thus able to be secured to the bottom of the magazine tube 23, the combination of pins 25 and slots 31 providing the well known "bayonet" type of fitting.

The magazine cap 32, a short cylinder closed at its bottom end 30 to which end is centrally attached rod 33 which, when the cap 32 is in position, extends loosely through all the central apertures in the flexible rings stacked within the magazine except the central aperture of the topmost flexible ring. Surrounding this rod in use is a helical coil compression spring 34 which provides part of pressure means to force the stack of rings towards the top of the magazine. A slider 35 slides within the magazine and over the rod 33 in use. The upper portion 36 of the slider is of greater diameter than the lower portion 41 and provides a step against which bears the top of the compression spring 34 part of which surrounds the lower portion 41 of the slider. Radially extending from the upper portion 36 is a fingergrip 42 in the form of a shaft with a suitably flattened and roughened end. The fingergrip 42 extends through the slot 24 in the tube 23 for a purpose which will now be described.

Figure 9:
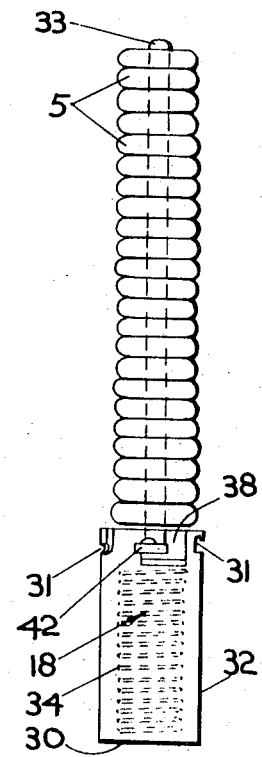
FIG. 9 shows the pressure means and a stack of flexible rings assembled thereon prior to insertion into the magazine.

In order to make loading of the magazine 4 as easy as possible the magazine cap 32 is removable from the magazine tube 23 and the slider 35 may be actuated by the fingergrip 42 and slid towards the bottom of the magazine cap 32 compressing the spring 34. A further large slot 38 of the "bayonet" type is provided between the bayonet-type slots 31 to the top edge of the magazine cap 32 and the fingergrip 42 is able to be located within this slot 38 which keeps the spring 34 in compression while enabling one or a larger number of flexible rings 5 to be stacked on the extended rod 33. This arrangement is shown in FIG. 9. The bottom edge of the magazine tube 23 has a rectangular notch (not shown) cut out of it communicating with the forward edge of the slot 24 which enables the magazine cap 32 to be assembled on to the magazine tube 23 while the fingergrip 42 of the slider is still engaged with the large slot 38. When the magazine cap 32 has been reengaged with the tube 23 the fingergrip 42 may be released from its slot and the spring 34 will force the slider 35 up the inside of the magazine tube 23 until the top O-ring 5 butts against the U-shaped stop means 17. If necessary the slider may be manipulated by its fingergrip 42 in the event that the stack of rings binds on the interior of the magazine tube 23.

The magazine tube 23 is attached to a plate 39 having three slotted holes 40 therein. The shanks of machine screws 45, the heads of which bear on the plate 39, pass through the slotted holes 40 and into tapped holes in the butt 1. The adjustment thus provided between the magazine 4 and the fixed and rotatable tubes 2 and 6 enables the magazine 4 to be located so that in use when the hook 10 has penetrated the central aperture of the topmost O-ring it emerges through the slot 20 just at the intersection of the top and second O-rings. Otherwise the alignment of the magazine 4 is such that the central axis of the stack of flexible rings within it lies in the plane of The stop means 17 previously mentioned is a substantially U-shaped member which is fastened to the top of the magazine tube 23. The slot 19 is provided between the inner and outer arms 43 and 44 of this cap which extend outwardly and downwardly towards the spike 16. The function of these extended arms is to ensure that the central aperture of the top O-ring, when it is removed from its fixed position by the hook 10, is maintained low down so that it will be penetrated by the spike 16 as the hook 10 is rotated. The spike 16 cannot be placed too near the perimeter of the front end of the rotatable tube 6 otherwise it would prevent the O-ring from being discharged therefrom once it had been stretched around the perimeter and, of course, it must be clear of the path of the hook 10.

The block 15 holding the spike 16 is also provided with two-slotted holes 47 and is held to the butt 1 by means of machine screws 46, the shanks of which pass through these holes and into suitably tapped holes in the butt 1 the heads of which bear on the block 15. This arrangement enables the position of the spike 16 which lies approximately in the plane of the front end of the rotatable tube 6 to be adjusted so that it lies below and just behind the space occupied by the hook 10 as the hook is rotated.

In the rear of the butt 1 adjacent knurled handgrip 8 there is provided a slot (not shown) through which passes portion of a lever 48, the outline of the lever being shown mostly in dotted outline in FIGS. 1 and 3. The lever is pivoted on a pivot pin 55 which passes through both it and the butt. The rear end of lever 48 is provided with a thumb tab 49 and the front end with an eye 50. The abovementioned slot through which the lever 48 passes communicates with the interior 52 of the butt 1. A tension spring 53 which lies within the interior 52 has one end hooked around the eye 50 and the other end around a further eye 53 fastened to the butt. As can be seen from FIGS. 1 and 3 the lever 48 includes an upstanding projection 54 which is engageable with a slot (not shown) in the knurled handgrip 8. The spring 51 ordinarily forces the projection 54 towards this slot so that as the knurled handgrip 8 is rotated a position is eventually reached where it becomes locked to the butt 1 by means of the lever 48 and its projection 54. The position of the slot in the knurled handgrip 8 is such that this occurs when the two inspection apertures 3 and 11 are aligned which in turn occurs when the hook 10 has reached the 3 or 4 O'clock position by which time a flexible ring has been completely stretched around the end of the tube 6. The tube 6 is thus held against accidental rotation while the tail or scrotum of the animal is being positioned and the flexible ring released from the end of the tube 6, The discharge means 21 comprise the trigger 22 which is pivoted about a pin 61 which extends from the butt 1. The butt 1 includes a suitable slot 62 between the interior 52 and the outside in the region of the trigger 22 to enable the latter to be manipulated. There is also a further slot 63 adjacent the fixed tube 2 to allow the upper forked end 64 of the trigger to move. The forked end 64 of the trigger engages around a pin 65 which extends downwardly from a curved plate 66. This curved plate has the same radius of curvature as the fixed tube 2 and is slidable within a slot 67 cut into the bottom of the fixed tube 2 on either side of the central line thereof. The curved plate 66 is slightly shorter than the length of slot 67 and is able to be moved backwards and forwards in the slot by means of the trigger 22 coacting with the pin 65. To the forward edge of the curved plate 66 is fastened a curved arm 68 which extends upwardly around the outside of the fixed tube 62. At right angles to the curved arm 68 there is fastened a slotted arm 69 having a slot 70 therein. A short grub screw 75 is screwed into a suitable hole in the ring-shaped portion 76 which comprises part of the front tube 2 and this grub screw serves to guide the slotted arm 69 when it is moved by the trigger 22. To the very front of the slotted arm 69 is fastened a perpendicular pushing strip 77. This normally lies within a slot 78 in the ring-shaped portion 76 being held in this position by virtue of a tension spring 79 one end of which is hooked into provided on trigger 22 between the forked end 64 and the pin 65. The side plates 83 and 84 which fit on the butt 1 are roughened on their outer surfaces and the side plate 83 is provided with a thrust block 85 (which can be seen in FIG. 5) which prevents the trigger 22 from moving sideways off its pivot pin 61. The ring guide 7 mentioned earlier which provides a back stop for a flexible ring stretched over the end of the tube 6 and which prevents the tube from sliding axially with respect to the fixed tube 2 does not extend completely around the periphery of the tube 6. Instead there is a gap 81 provided in such a position that when the projection 54 on the lever 48 engages with the slot in the knurled handle 8 this gap is directly in front of the pushing strip 77. Only in this position is the trigger 22 able to be operated, otherwise the pushing strip 77 hits against the rear surface of the ring guide. The function of the pushing strip 77 in use is to cause a portion of a flexible ring stretched around the perimeter of the tube 6 to slide off the front end whereupon the elastic forces within the flexible ring cause the rest of it to contract and the ring jumps over the hook 10 and also a guiding flange 82 (whose function will shortly be explained) and into position on the animal. The abovementioned guiding flange 82 which can be seen clearly in FIG. 8 is to ensure that in the last stages of stretching a flexible ring around the tube the portion of the ring just above the spike 16 is held in towards the end of the tube so that when the ring finally slips from th spike 16 it will jump onto the end of the tube 6. The guiding flange 82 is located at the very front of the tube 6 and is about 1 inch long. A groove is thus formed between the guiding flange 82 and the ring guide 7 within which the flexible ring lies. The guiding flange commences 90° in front of the position of the hook 10 as viewed in the direction of rotation and the height of it tapers gradually along its length to nothing.

Attached centrally to the top of the ring-shaped portion 76 constituting the front end of the fixed tube 2 is a double-pronged member 90 which extends over and beyond the front end of the tube 6. The function of this member is to prevent a ring dislodged from the front end of the tube 6 from flying too far forward.

That completes the description of the preferred form of the applicator and it is envisaged that this would be used with flexible rubber O-rings having a central aperture about seven-thirtyseconds of an inch in diameter and having an outside diameter of nineteen-thirtyseconds of an inch. It should be appreciated that the invention is not restricted to an apparatus in which the hook 10 is attached to a movable tube. It would, of course, be quite possible to move the hook independently of the front end of the tube to stretch the ring around the same, nor is the invention restricted to an apparatus in which the hook penetrates first through the central aperture of the top ring before emerging between the intersection of the top and second rings. The hook could equally well penetrate through the intersection between the two rings and emerge from the central aperture. This would necessitate in one arrangement that the magazine 4 be placed at 90° to its present position extending out to the left of the apparatus as viewed from the rear. It is, of course not necessary that the tube about which the ring is stretched be completely circular, although this will obviously be preferable, nor that the tube should have a considerable length as in the case in the preferred form described. It will also be apparent that the magazine could be moved relative to the butt and the tube 6 rather than there being provided a rotatable tube as in the case in the preferred form.

I claim:

1. An applicator for applying a flexible ring for use in docking or castrating an animal, said applicator comprising locating means for locating a flexible ring in a fixed position from which said ring can be moved by operation of said applicator, a spike pointing towards said fixed position and in stationary relationship therewith, a tube having an open end which is close to said fixed position, the plane of said open end being substantially coincident with an axial plane of a flexible ring located in said fixed position, the axis of said tube lying at substantially right angles to the axis of such a flexible ring; a hook substantially coplanar with said end of said tube and protruding beyond the perimeter thereof a suitable distance; operable means to move said hook and said spike relative to each other in a rotary motion about the axis of said tube to stretch a flexible ring around said tube and discharge means to dislodge a flexible ring which has been stretched around the perimeter of said tube, the construction and arrangement being such that in use upon relative rotation said hook penetrates the central aperture of a flexible ring located in said fixed position and moves said ring therefrom and over said spike which also penetrates said central aperture, further relative rotation causing said ring to be progressively stretched around the perimeter of said tube part of said flexible ring eventually slipping off said spike so that the whole of said ring is stretched around the perimeter of said tube said discharge means being operable to dislodge said ring over said open end of said tube where it can contract around the suitably situated tail or scrotum of an animal.

2. An applicator as claimed in claim 1 wherein said hook is attached to said tube and said tube and said spike are rotatable relative to each other about the axis of said tube.

3. An applicator as claimed in claim 2 wherein said tube is a cylinder.

4. An applicator as claimed in claim 2 wherein said spike is substantially coincident with the plane of said open and of said tube.

5. An applicator as claimed in claim 4 wherein the direction of said spike, the axis of said tube and the axis of a flexible ring in said fixed position are mutually orthogonal.

6. An applicator as claimed in claim 5 which includes a magazine capable of holding a quantity of flexible rings and locating means to ensure that while there are flexible rings in said magazine one of them is located in said fixed position.

7. An applicator as claimed in claim 6 wherein said magazine includes a cylindrical bore within which may be contained a stack of flexible rings.

8. An applicator as claimed in claim 7 wherein said locating means includes stop means located at the end of said bore adjacent said tube, and pressure means said pressure means being adapted to force said stack of flexible rings towards said stop means so that when one flexible ring is removed from said fixed position during operation of said applicator another flexible ring is forced into its place.

9. An applicator as claimed in claim 8 wherein said hook is attached to said tube and said tube is a comparatively long cylinder to enable it to be easily grasped and is supported intermediate its ends for rotation about its axis with respect to said spike.

12. An applicator as claimed in claim 8 wherein said tube includes an inspection aperture in the wall thereof adjacent said open end.

10. An applicator as claimed in claim 9 wherein said rotatable tube is supported for rotation by a fixed tube overlying it and in stationary relationship with said spike.

11. Apparatus as claimed in claim 10 wherein said discharge means includes a pushing member which enables a flexible ring stretched around the perimeter of said tube to be pushed therefrom.